(12) United States Patent
Boley et al.

(10) Patent No.: US 8,577,929 B2
(45) Date of Patent: Nov. 5, 2013

(54) VISUAL MANIPULATION OF DATABASE SCHEMA

(71) Applicant: Apple Inc., Cupertino, CA (US)

(72) Inventors: Jesse Leon Boley, Santa Clara, CA (US); Ryan David Shelby, Los Gatos, CA (US); Ryan Christopher Griggs, San Jose, CA (US); Kevin Iversen Smith, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/657,572

(22) Filed: Oct. 22, 2012

(65) Prior Publication Data

US 2013/0198684 A1  Aug. 1, 2013

Related U.S. Application Data

(63) Continuation of application No. 12/752,953, filed on Apr. 1, 2010, now Pat. No. 8,296,332.

(51) Int. Cl.
*G06F 17/30* (2006.01)
*G06Q 50/00* (2012.01)

(52) U.S. Cl.
USPC ............ 707/803; 707/946; 707/975; 705/313

(58) Field of Classification Search
USPC ............ 707/803, 946, 957, 999.102; 705/313
See application file for complete search history.

(56) References Cited

U.S. PATENT DOCUMENTS

| | | | |
|---|---|---|---|
| 5,831,664 A | 11/1998 | Wharton et al. | |
| 5,857,174 A | 1/1999 | Dugan | |
| 6,385,541 B1 | 5/2002 | Blumberg et al. | |
| 6,636,803 B1 | 10/2003 | Hartz et al. | |
| 6,871,140 B1 * | 3/2005 | Florance et al. | 701/516 |
| 7,574,668 B2 | 8/2009 | Nunez et al. | |
| 7,890,091 B2 | 2/2011 | Puskoor et al. | |
| 8,296,332 B2 * | 10/2012 | Boley et al. | 707/803 |
| 2004/0021584 A1 | 2/2004 | Hartz et al. | |
| 2005/0172261 A1 | 8/2005 | Yuknewicz et al. | |
| 2006/0015846 A1 | 1/2006 | Fraleigh et al. | |
| 2008/0244510 A1 | 10/2008 | Cote | |
| 2009/0144097 A1 | 6/2009 | Fassio et al. | |
| 2010/0145800 A1 | 6/2010 | Eraker et al. | |

OTHER PUBLICATIONS

Alonso, et al., A Pen-based Database Interface for Mobile Computers, pp. 130-137, 1994 First Workshop on Mobile Computing Systems and Applications, 1994.

Takashi Miyaki and Jun Rekimoto, "GraspZoom: zooming and scrolling control model for single-handed mobile interaction", ACM MobileHCI'09 Proceedings of the 11th International Conference on Human-Computer Interaction with Mobile Devices and Services, 2009, pp. 1-4.

\* cited by examiner

*Primary Examiner* — Cheryl Lewis
(74) *Attorney, Agent, or Firm* — Fish & Richardson P.C.

(57) ABSTRACT

Methods, program products, and systems for visual manipulation of database schema are disclosed. In general, in one aspect, a system can display a schema view and a data view in graphic representation in an integrated GUI on a display device. The system can display a schema in the schema view, and one or more data records in the data view. The system can receive a touch input from the display device in the schema view, or the data view, or both. In response to the touch input, the system can modify the schema, or the data records, or both. The system can update the schema view and data view substantially simultaneously to reflect the modification in the schema or data records.

18 Claims, 14 Drawing Sheets

US 8,577,929 B2

VISUAL MANIPULATION OF DATABASE SCHEMA

CROSS-REFERENCE TO RELATED APPLICATIONS

This application is a continuation of U.S. patent application Ser. No. 12/752,953, now U.S. Pat. No. 8,296,332 filed on Apr. 1, 2010, the entire contents of which are hereby incorporated by reference.

TECHNICAL FIELD

This disclosure relates generally to database manipulation.

BACKGROUND

A database management system (DBMS) can be a software system that includes a data model, a data language for definition and manipulation of data, and mechanisms for enforcing and implementing security, integrity, and concurrency of the data in the database. A user can use a formal language, e.g., data-definition language (DDL) or data-manipulation language (DML), to communicate with a database. A database schema describes a structure of the data using a formal language. For example, the data in the database can be structured as a collection of data records.

Many modern database tools integrate a database engine with a graphical user interface (GUI). In the GUI, a user can use one database tool (e.g., a data modeler tool) to manipulate the schema of the database, and use another database tool (e.g., a form tool or a report tool) to manipulate or display the data records.

SUMMARY

Methods, program products, and systems for visual manipulation of database schema are disclosed. In general, in one aspect, a system can display a schema view and a data view in graphic representation in an integrated GUI on a display device. The system can display a schema in the schema view, and one or more data records in the data view. The system can receive a touch input from the display device in the schema view, or the data view, or both. In response to the touch input, the system can modify the schema, or the data records, or both. The system can update the schema view and data view substantially simultaneously to reflect the modification in the schema or data records.

The details of one or more implementations of visual manipulation of database schema are set forth in the accompanying drawings and the description below. Other features, aspects, and advantages of visual manipulation of database schema will become apparent from the description, the drawings, and the claims.

BRIEF DESCRIPTION OF THE DRAWINGS

Like reference symbols in the various drawings indicate like elements.

DETAILED DESCRIPTION

GUIs for Visual Manipulation of Database Schema

Figure 1:
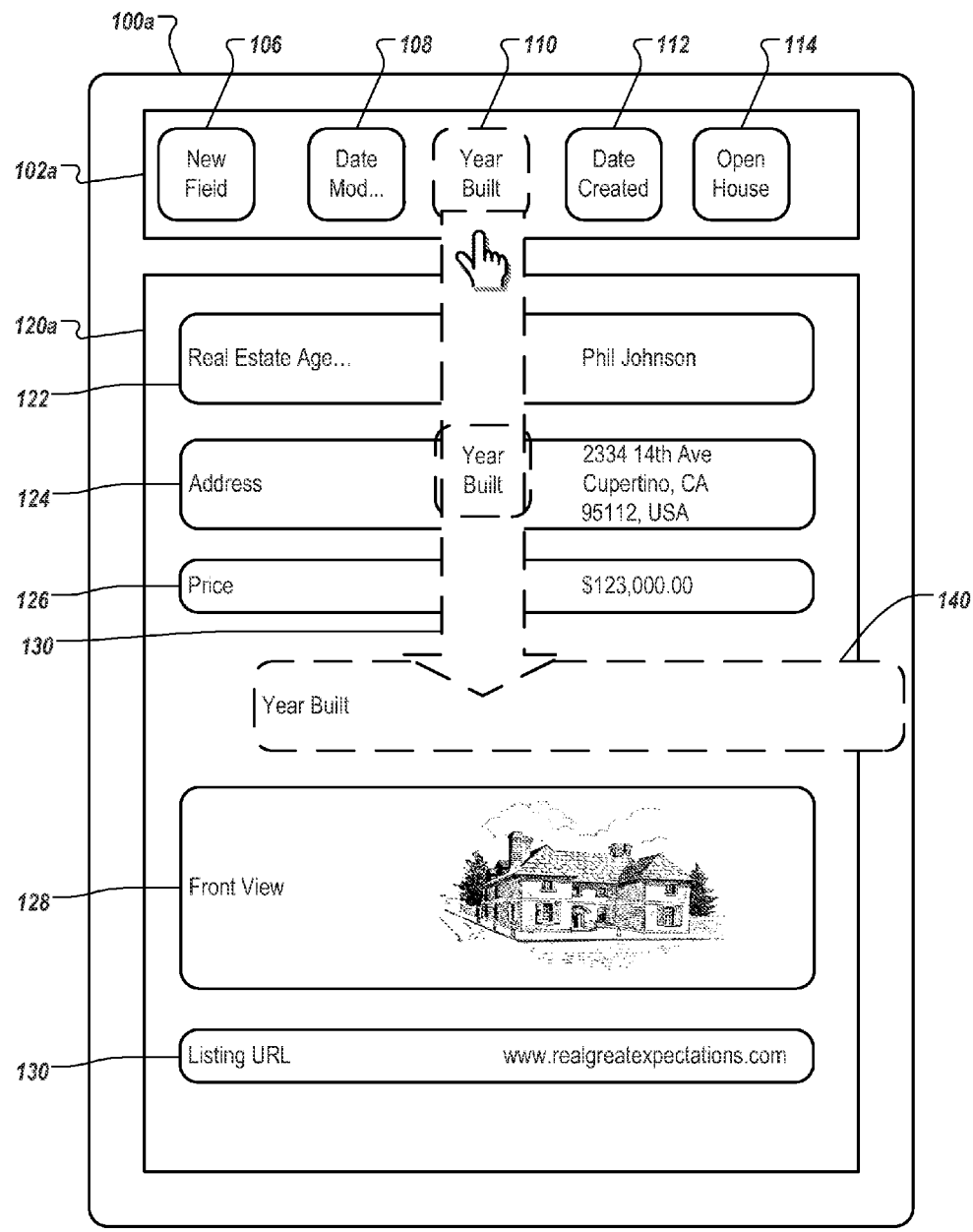
FIG. 1 illustrates an exemplary user interface for changing a status of a data field in a database schema and updating a data view simultaneously.

FIG. 1 illustrates exemplary user interface 100*a* for changing a status of a data field in a database schema and updating a data view simultaneously. User interface 100*a* can be a graphical user interface displayed on a display device on a mobile device. For illustrative purposes, an exemplary database of real estate information is described.

User interface 100*a* can include at least two views, schema view 102*a* and data view 120*a*. The mobile device can display information related to the schema of the database in schema view 102*a*. The database can be a relational database, an object-oriented database, or any other database that includes data sets and descriptions of the data sets. In a relational database, the schema can define tables, data fields of the tables, relationships, views, indexes, packages, procedures, functions, queues, triggers, types, sequences, synonyms, links, and other elements. In the exemplary database of FIG. 1, representations 108, 110, 112, and 114 of data fields in the exemplary database are displayed in schema view 102*a*.

Representations 108, 110, 112, and 114 of data fields can include icons or labels (e.g., text) or both. Each of the representations 108, 110, 112, and 114 of data fields can correspond to a particular column of a data table in the database. A "new field" icon or label 106 can be displayed together with representations 108, 110, 112, and 114. Schema view 102*a* can be a display view that can receive a touch input from a user. For example, a user can touch a portion of schema view 102*a* with a pointing means (e.g., a finger or a stylus), and make a gesture to move the pointing means across schema view 102*a*. In response to the gesture, representations 108, 110, 112, and 114 can be animated to scroll to the left or right to display more representations of data fields in schema view 102*a*. In various implementations, the "new field" icon or label 106 can scroll with representations 108, 110, 112, and 114 or be anchored at a configurable part of schema view 102*a*.

The mobile device can display a data record in data view 120*a*. In some implementations, the displayed data record can correspond to a virtual view of the database. The virtual view of the database can be formed using a stored query. The virtual view can include a virtual database table generated from the result of the stored query. The virtual view is not required to be part of the schema of the database. In the example database, the virtual view can include data fields "real estate agent," "address," "price," "front view," and "listing URL." These data fields can be displayed in display fields 122, 124, 126, 128, and 130, respectively. In some implementations, data view 120a can be used as a layout editor. For example, data view 120a can be a template where placement of various display fields 122, 124, 126, 128 and 130 can be arranged. The template can be populated using an actual data record from the database, and can be used for browsing other data records.

At least some of representations 108, 110, 112, and 114 can represent hidden data fields. A hidden data field can be a data field included in a database schema but not displayed in data view 120a. For example, a data field "year built" represented by representation 110 can be excluded from the virtual view when the stored query does not include the data field "year built." In various implementations, a representation representing a hidden data field can be distinguished from representations representing visible data fields using a distinguishing color scheme (e.g., an icon having a distinct brightness) or a notation (e.g., an additional "H" mark). In some implementations, schema view 102a can be configured such that only representations of hidden data fields are displayed.

Through user interface 100a, the mobile device can receive touch input 130. Touch input 130 can include a touch by a pointing means on representation 110 in schema view 102a, a dragging motion of the pointing means into data view 120a, and a release of the pointing means from user interface 100a. Upon receiving the touch input 130, the mobile device can create a new display field 140 in data view 120a. New display field 140 can display data of data field "year built" in the database. New display field 140 can be positioned at a place that corresponds to where the pointing means is released from user interface 100a. For example, if a user touches representation 110 with a finger, drags representation 110 to a location in data view 120a that is between display field 126 and display field 128, display field 128 and display fields after display field 128 (e.g., display field 130) can be shifted downwards to make room for new display field 140. The amount of shift can correspond to a height of display field 140, which can be a default height or a height calculated based on the data in data field "year built" (e.g., based on a number of lines in the data).

Upon receiving touch input 130, the mobile device can modify the stored query that generated the virtual view to be displayed in data view 120a. The modified query can include the new data field selected from the schema view. The virtual view can change in accordance with user input 130.

Figure 2:
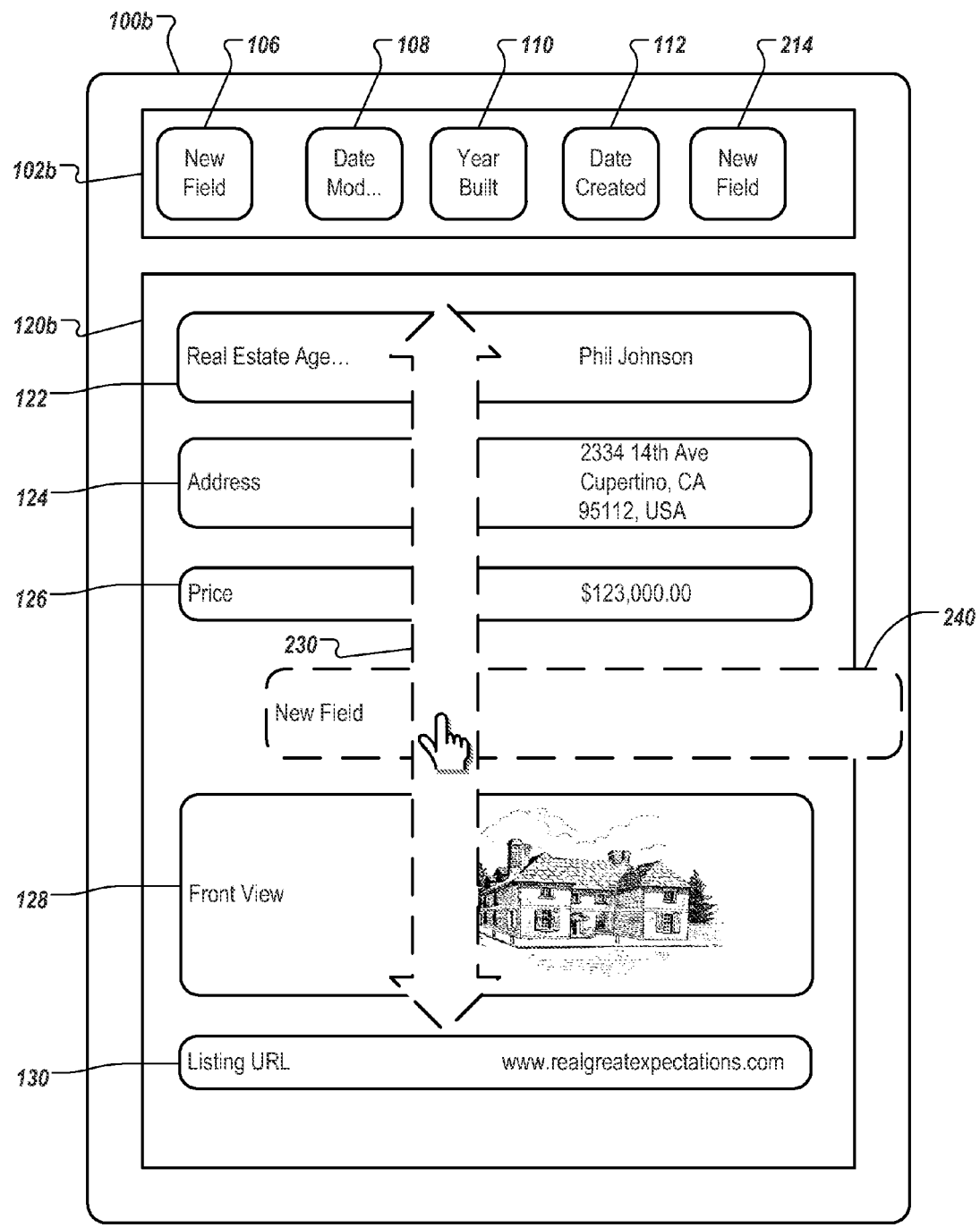
FIG. 2 illustrates an exemplary user interface for adding a new data field in a database schema in a data view.

FIG. 2 illustrates exemplary user interface 100b for adding a new data field in a database schema in a data view. User interface 100b can be a graphical user interface displayed on a display device on a mobile device.

Through user interface 100b, the mobile device can receive a touch input for adding a data field. Receiving the touch input can include, for example, receiving a touch (e.g., a tap or a click) by a pointing means on "new field" icon or label 106 in schema view 102b. Upon receiving the touch input, the mobile device can create new display field 240. User interface 100b can display new display field 240 at a position that overlaps data view 120b, so that new display field 240 appears to hover over data view 120b.

In some implementations, the mobile device can create new display field 240 in response to a spreading gesture. For example, the mobile device can detect a spreading gesture (e.g., the fingers opening up) and determine that the spreading gesture is intended for creating a new display field 240.

Through user interface 100b, the mobile device can receive a second touch input 230. Receiving touch input 230 can include detecting a touch by a pointing means on new field 240, and detecting a dragging motion of the pointing means. In response to the dragging motion of the pointing means, new display field 240 can be moved the direction of the dragging motion, including following a motion path of the dragging motion (e.g., moving fingers up or down). Upon the movement of new display field 240, other display fields (e.g., display field 126 and display field 128) can move (e.g., spread apart) to make room for new display field 240.

In some implementations, receiving the touch input can include receiving a multi-touch gesture (e.g., using two fingers) in data view 120a. Receiving multi-touch input can include receiving a first touch on one display field (e.g., display field 126) by one finger and a second touch on another display field (e.g., display field 128) by another finger substantially simultaneously, and detecting a spreading gesture. Upon receiving the multi-touch input, the two display fields being multi-touched (e.g., display field 126 and display field 128) can be separated (e.g., a distance between display field 126 and display field 128 can be increased) to allow for insertion of new display field 240.

Through user interface 100b, the mobile device can receive a third touch input on new display field 240. Upon receiving the third touch input, the mobile device can display a configuration interface. Through the configuration interface, the mobile device receive various configurations of new display field 240 and data to be displayed in new data display field 240. Further details of the configuration interface will be discussed below with respect to FIG. 3.

The insertion of new display field 240 can correspond to a creation of a new data field in the schema of the exemplary real estate information database, even when the insertion is performed entirely in data view 120b. For example, in a relational database, a new column in a database table can be created to correspond to the new data field. The new column in the database table can be populated by a default value or user input. Corresponding changes can be made to the stored query that generates a virtual view. The stored query can include a new name corresponding to the new data field, at a position determined by the position of new display field 240 relative to other display fields (e.g., between display field 126 and display field 128).

New representation 214 of the new data field can be displayed in schema view 102b. The mobile device can display new representation 214 and new display field 240 substantially simultaneously, to give an appearance that new representation 214 and new display field 240 are displayed at the same time.

Figure 3:
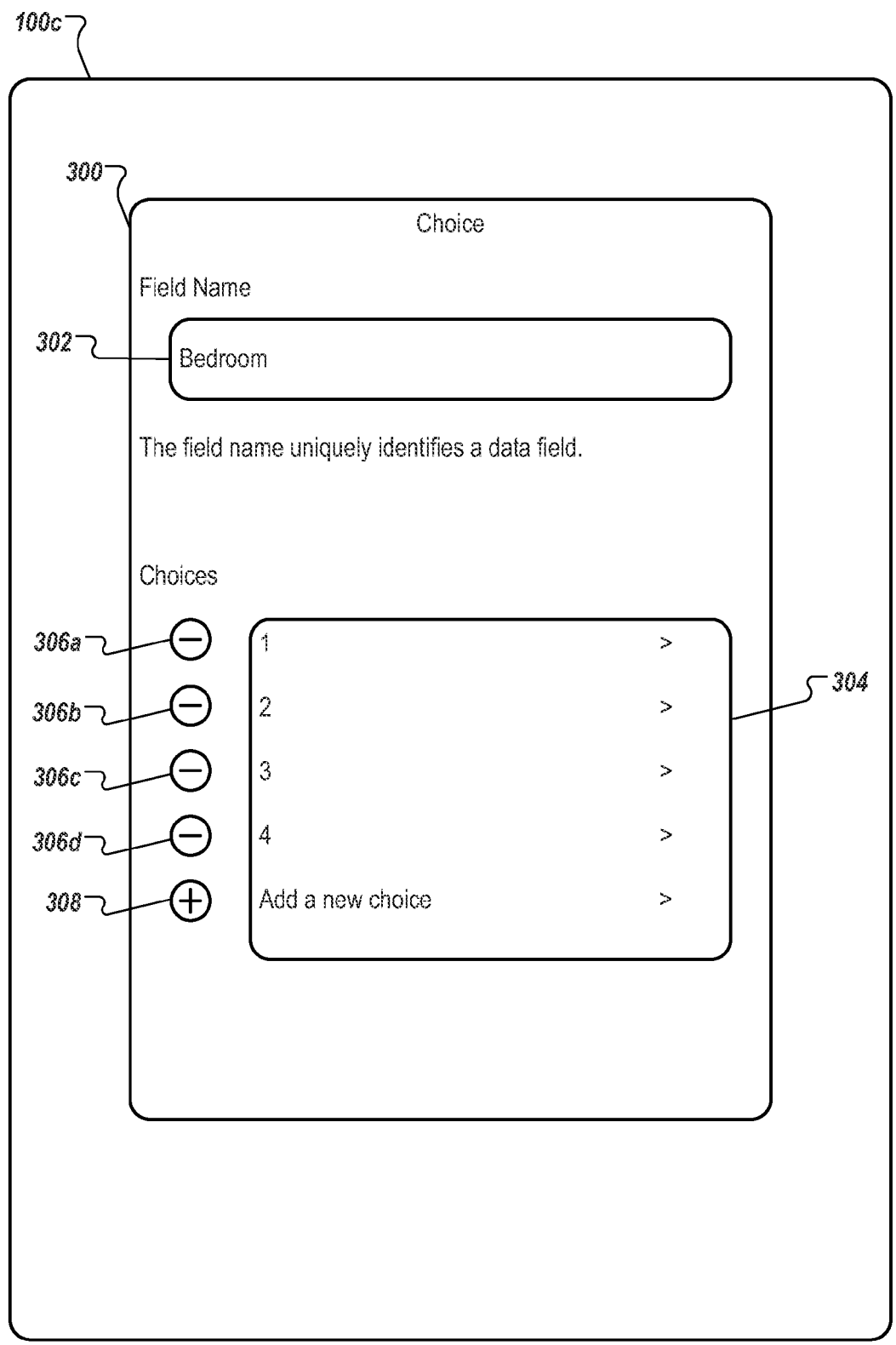
FIG. 3 illustrates an exemplary user interface for manipulating a data field name and definition in a data view.

FIG. 3 illustrates an exemplary user interface for manipulating a data field name and definition in a data view. User interface 100c can be a graphical user interface displayed on a display of a mobile device.

User interface 100c can include configuration interface 300 for configuring a new data field (e.g., the new data field that corresponds to new display field 240) or an existing data field. Configuration interface 300 can include a display panel (e.g., a window or a pane that has an appearance of a note pad).

The data field to be configured can have a data type defined in the schema. The data type can be configured at a time when new display field 240 is inserted. The data type can include, for example, text, image, video, audio, number, or choice. A "choice" data type can include one or more enumerated values. When a data field has a "choice" data type, the data field can have a value that is selected from the enumerated values. For illustrative purposes, configuration interface 300 is described in context of a "choice" data type.

Configuration interface 300 can include "field name" input field 302 that can accept user inputs of a field name. Upon receiving a touch input in "field name" input field 302, a virtual keypad can be displayed in user interface 100c to accept typed field names (e.g., "Bedroom"). The data field having a "choice" type can be subsequently identified using field name "Bedroom."

The enumerated values for field "Bedroom" can be configured using choice panel 304 and associated choice controls 306a-d and 308. Control 308 can be an "add a choice" control. Upon receiving a touch input on control 308, a new choice (e.g., a placeholder for a value) can be added to existing enumerated values in choice panel 304. The new choice can be a further configured (e.g., to be given an actual enumerated value, including a numeric value or a text string) when the mobile device receives a second touch input on a sign (e.g., a ">" sign) displayed in association with the placeholder. Controls 306a-d can be "delete a choice" controls. Upon receiving a touch input on one or more of controls 306a-d, the mobile device can remove an existing enumerated value associated with that control. For example, for the "Bedroom" choice data field, a user can tap on control 308 to add values "1," "2," "3," and "4" to allow the "Bedroom" choice data field to have values representing one through four bedrooms. The user can tap on one or more of controls 306a-d to remove a particular number of bedrooms from the choices. Configuration interface 300 can be used to modify the schema of the exemplary real estate information database, regardless of whether configuration interface 300 was activated from a display field (e.g., new display field 240) on a data view (e.g., data view 120b) or activated from a representation of a data field in a schema view (e.g., schema view 102b).

Figure 4:
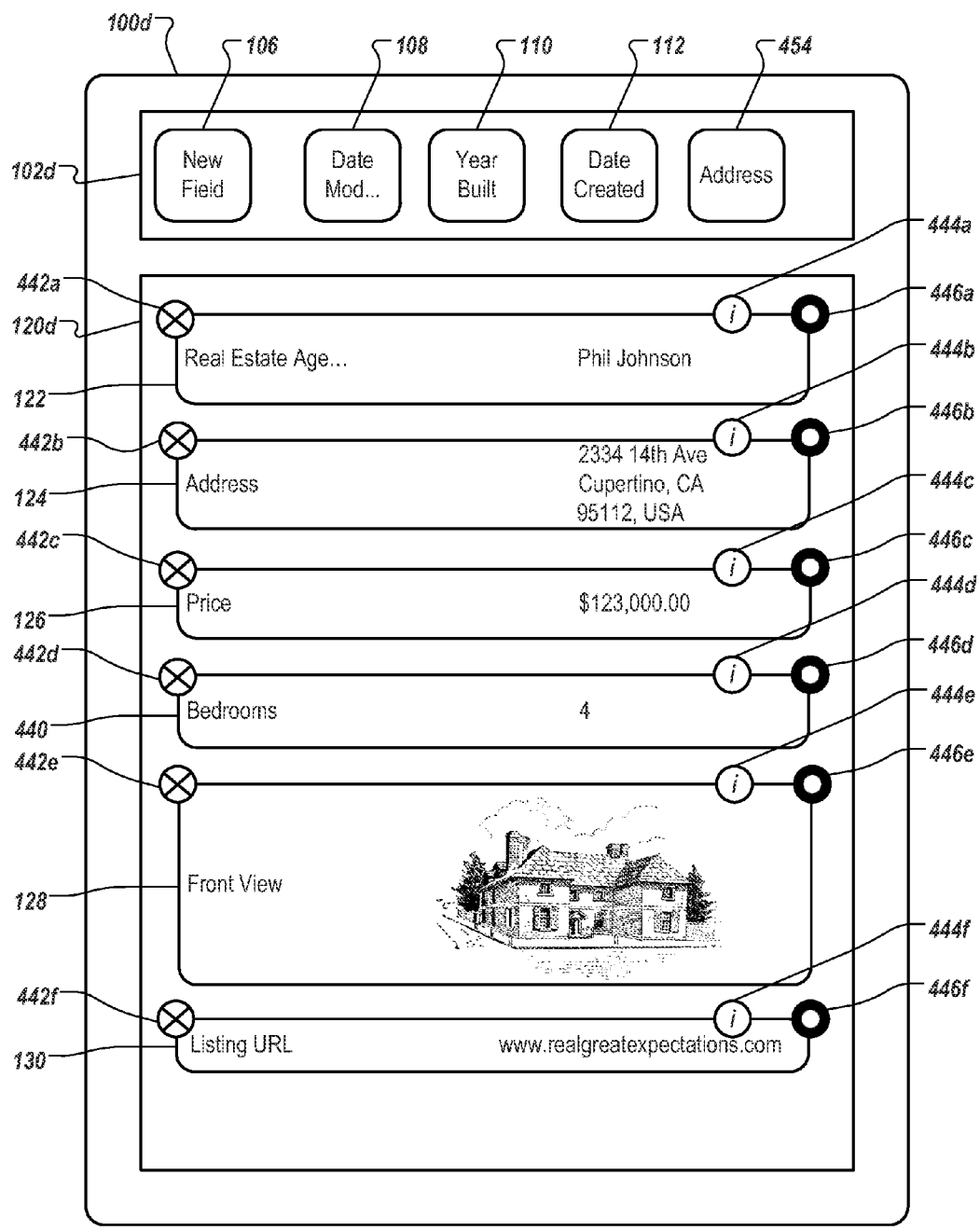
FIG. 4 illustrates an exemplary user interface for manipulating the database schema in a data view.

FIG. 4 illustrates an exemplary user interface for manipulating the database schema in a data view. User interface 100d can be a graphical user interface displayed on a display device on a mobile device.

User interface 100d can include schema view 102d and data view 120d. Schema view 102d can include one or more representations of data fields in the database schema, including data fields that are visible in data view 120d and data fields that are hidden from data view 120d. One or more display fields 122, 124, 126, 440, 128, and 130 can be displayed in data view 120d. Each display field can be associated with a delete field control 442, a field information control 444, and a hide field control 446.

Through user interface 100d, the mobile device can receive a touch input from delete field control 442 for deleting a data field corresponding to the display field (e.g., display field 122) to which the delete field control (e.g., delete field control 442a) is associated. Upon receiving the touch input, the mobile device can delete the data field (e.g., data field "real estate agent") from the database schema. Actual data that correspond to the data field can be deleted at the same time, or cached until the mobile device receives a user confirmation to commit the change. A representation corresponding to the deleted field, as well as the display field corresponding to the data field (e.g., display field 122) can be deleted from schema view 102d and data view 120d, respectively, at substantially the same time, upon the deletion of the data field from the database schema.

Through user interface 100d, the mobile device can receive a touch input from field information control 444 for configuring a data field corresponding to the display field (e.g., display field 440) to which the field information control (e.g., field information control 444d) is associated. Upon receiving the touch input, a configuration interface (e.g., configuration interface 300) can be displayed to allow a user to configure the data field.

In some implementations, a spreading gesture can be used for invoking the display of the configuration interface. Through user interface 100d, the mobile device can receive a spreading gesture on a display field (e.g., display field 128). The spreading gesture can mimic an action for pulling open two sliding doors. Upon receiving the spreading gesture, the mobile device can display schema settings, form configurations, and relationships between the data field displayed in display field 128 and other entities (e.g., tables, columns). The display can include an animation of display field 128 splitting into parts (e.g., into two parts from a middle point), the parts moving away from one another, and revealing information underneath the parts.

Through user interface 100d, the mobile device can receive a touch input from hide field control 446 for hiding a display field (e.g., display field 124) associated with the hide field control (e.g., hide field control 446b). Upon receiving the touch input from hide field control 446b, display field 124 can be hidden from data view 120d. In various implementations, hiding the display field can including removing a field name (e.g., "address") from a stored query that generates a virtual view for display, setting a value of an attribute of the data field corresponding to the display field to "hidden," or changing a layout for the data view to exclude the data field to be hidden. A representation of the data field corresponding to the display field to be hidden can change status (e.g., from one color scheme to another color scheme) to represent the new hidden status of the data field.

In some implementations, schema view 102d can be configured to display only hidden data fields. When receiving a touch input from hide field control 446b, display field 124 can be removed from data view 120d, and new representation 454 can be added to schema view 102d at substantially the same time. The removal and addition can be animated, for example, by changing (e.g., reducing) a display size of display field 124 until the display size is the size of new representation 454, and moving the display field with the reduced size from data view 120d to schema view 102d. The animation can include reducing the display size in a crumpling motion.

In some implementations, the mobile device can be configured to receive multiple touches selecting display fields. For example, the mobile device can receive a first touch input by one hand (e.g., one finger tapping and holding on display field 122), and one or more second touch inputs from another hand (e.g., a finger of a second hand tapping on display fields 124 and 126). In response to receiving the multiple touches, multiple display fields (e.g., display fields 122, 124, and 126) can be selected. The mobile device can batch delete, batch change attributes, batch add to collection, or batch hide the selected display fields.

Figure 5:
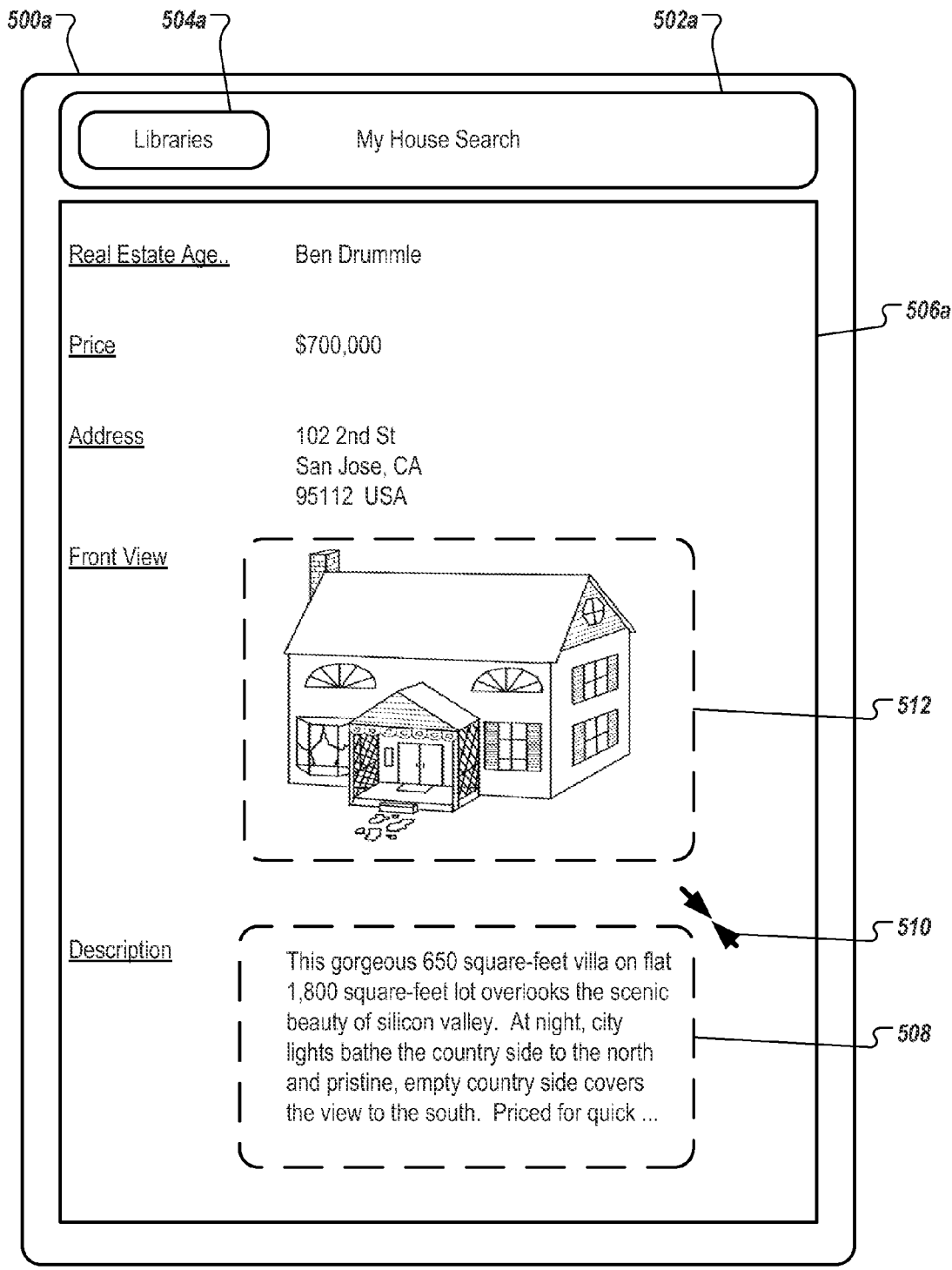
FIG. 5 illustrates an exemplary user interface for browsing a database.

FIG. 5 illustrates exemplary user interface 500a for browsing a database. User interface 500a can be a graphical user interface displayed on a display device on a mobile device. User interface 500a can be a user interface through which data records in a database can be presented to a user for browsing.

User interface 500a can include header area 502a, which can include library selection control 504a. User interface 500a can include data browsing section 506a, which can be used to display various data fields of a data record currently being viewed.

A data record can include a text field, which can include long text (e.g., a text string that can take a relatively large area to display completely). The text can be displayed in text display field 508. Pinch control 510 can be provided for controlling a size of text display field 508. Through user interface 500a, the mobile device can receive a multi-touch input from multiple pointing means (e.g., two fingers). The size of text display field 508 can decrease when the multiple pointing means come closer to each other (e.g., in a pinching gesture), and increase when the multiple pointing means move apart from each other (e.g., in a spreading gesture). When the size of the text display field decreases, undisplayed text can be represented by an ellipsis or other visual indicator. In some implementations, the multi-touch input can be received through text display field 508, to which pinch control 510 is associated. Likewise, pinch control 510 can be associated with media display field 512.

Media display field 512 can correspond to a media data field in the database. The media data field can store digital images, videos, or audios. In some implementations, through media display field 512, the mobile device can receive a touch input (e.g., a tap), and in response to the touch input, expand to occupy a larger space (e.g., the entire space) of the display device displaying user interface 500a. Expanded media display field 512 can be configured to receive further touch inputs (e.g., drawings by a pointing means). The drawings can be stored in the media data field. In these implementations, a user can create content in the database by drawing on the display device using a finger.

In some implementations, display sizes of display fields 508 and 512 can be automatically determined based on locations of display fields 508 and 512. For example, the mobile device can receive a touch input that includes touching display field 512 using a finger and dragging display field 512 to a location lower down in user interface 500a. The mobile device can squeeze display field 508 (e.g., by reducing a display height of display field 508) to make room for the new location of display field 512. Likewise, the size of display field 512 can be reduced if the mobile device receives a touch input increasing the size of display field 508. Reducing and increasing the size of display field 508 can include animating the change in size such that display field 508 appears elastic.

In some implementations, the mobile device can create a new data record in response to a spreading gesture. For example, the mobile device can detect a spreading gesture and determine the spreading gesture is intended for creating a new record, and then creating a new data record. Data field containing default values can be displayed on user interface 500a.

Figure 6:
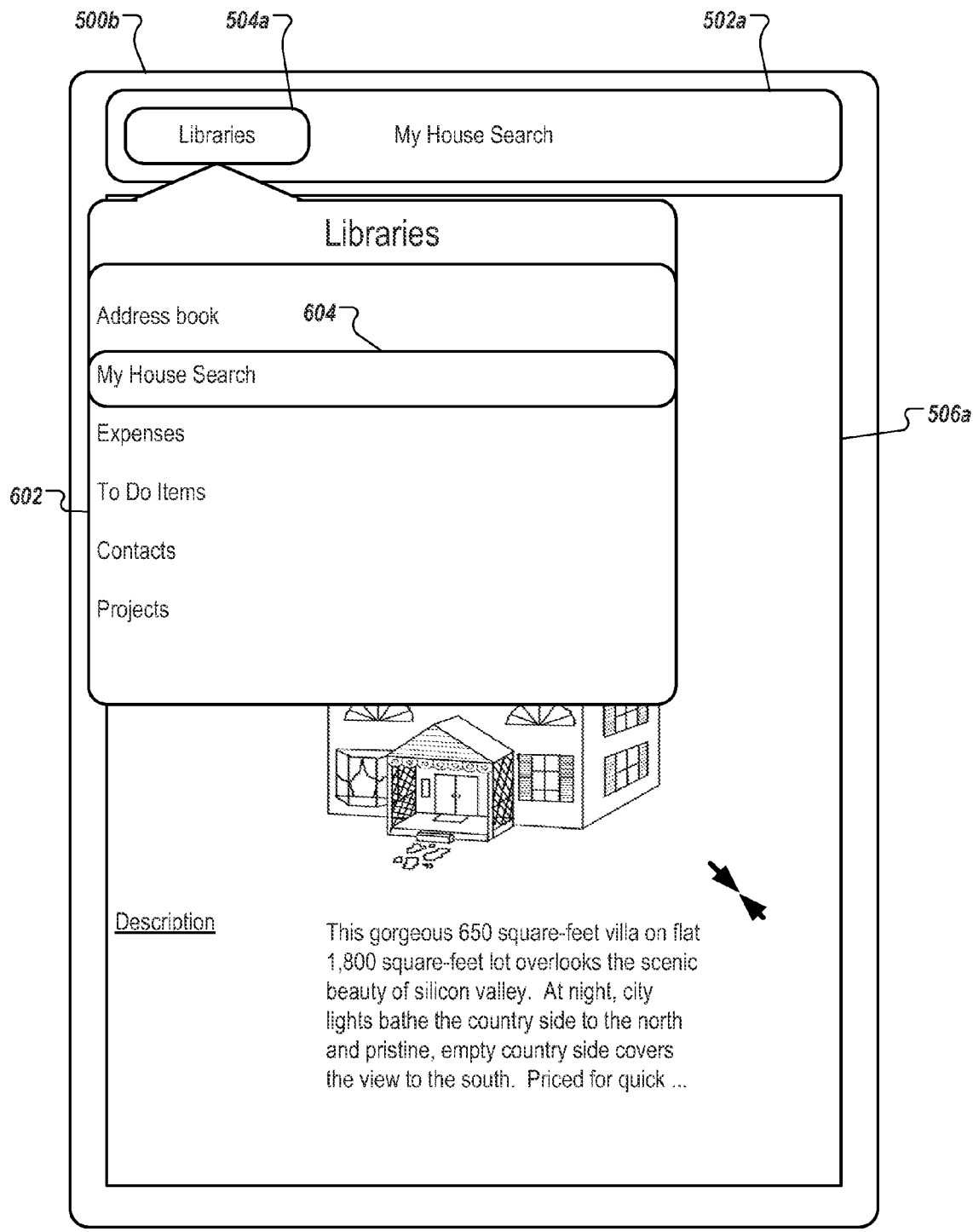
FIG. 6 illustrates an exemplary user interface for switching between various databases.

FIG. 6 illustrates exemplary user interface 500b for switching between various databases. User interface 500b can be a graphical user interface displayed on a display device on a mobile device. User interface 500b can be a graphical user interface through which a mobile device can present data records in a database to a user for browsing.

Through library selection control 504a, the mobile device can receive a touch input for selecting a library. A library can include a database schema, data records organized according to the schema, various display configurations (e.g., display layout, current record to be displayed, and time frame of video content to start to display for each record), and access privileges. Multiple libraries can be hosted on the mobile device, shared across multiple mobile devices, or be hosted on a server computer connected to the mobile device through a communications network.

Upon receiving the touch input from library selection control 504a, the mobile device can display library selection box 602 in user interface 500b. Library selection box 602 can include the names of one or more libraries currently accessible by the user who is currently logged on to the mobile device. A current library (e.g., library 604) can be marked (e.g., highlighted).

In some implementations, library selection box 602 can be configured to receive multi-touch gestures for revealing metadata about a current library. For example, the mobile device can perform data analysis on library "Expenses" upon receiving a spreading gesture from two or more pointing means, and display result of the data analysis. A pinching gesture can be use to dismiss the displayed result.

Figure 7:
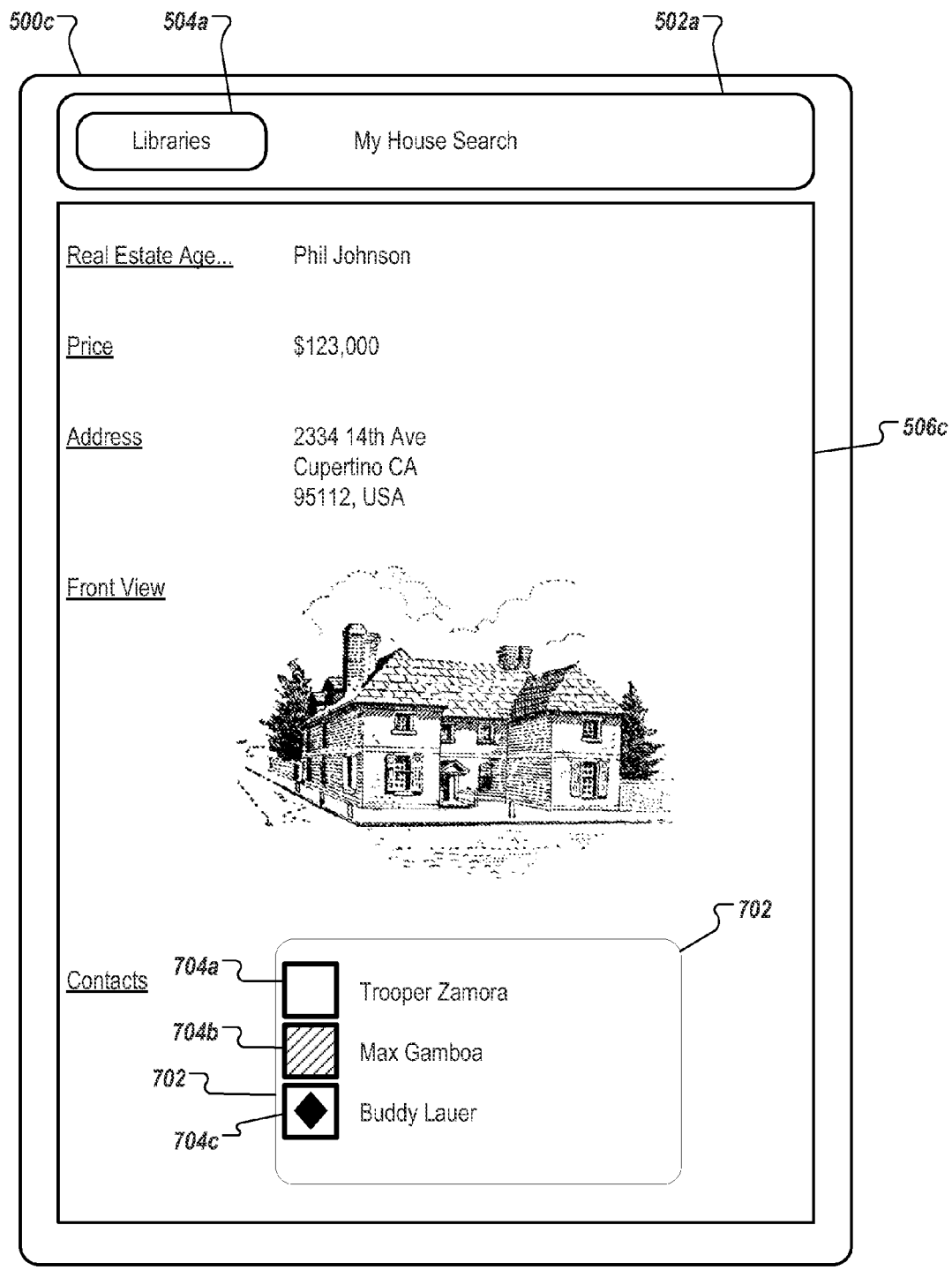
FIG. 7 illustrates an exemplary user interface for linking data fields between multiple databases.

FIG. 7 illustrates exemplary user interface 500c for linking data fields between multiple databases. User interface 500c can be a graphical user interface displayed on a display device on a mobile device. User interface 500c can be a user interface through which data records in a database can be presented to a user sequentially for browsing.

User interface 500c can include data browsing section 506c, which can include various display fields of a current data record (e.g., a data record currently being viewed). Data browsing section 506c can include contact display field 702, which can display various contacts related to the current data record.

Contact display field 702 can include one or more representations 704a-c of various contacts. Representations 704a-c can include, for example, icons or avatars of the contacts, as well as names of the contacts. The icons, avatars, or names of the contacts can be stored in a database in a library (e.g., a "Contacts" library) other than the current library (e.g., the real estate information library "My House Search"). To edit (add, delete, modify) contacts displayed in contact display field 702, the mobile device can receive a touch input in display field 702, and display a prompt for linking to another library. The prompt can include a list of libraries accessible by a current user of the mobile device. The mobile device can receive a second touch input selecting a library to link to, and a third touch input to select records and fields of records that will be related to the current record.

The mobile device can receive the touch inputs in data browsing section 506c. Based on the touch inputs, the mobile device can create a relationship in the schema of the current database (e.g., the real estate information in the current library) or the other database (e.g., the database in the "Contacts" library) or both databases. The editing of the schema can be accomplished in data browsing section 506c while data records are being browsed. A user is not required to go to access a specific interface for editing database schemas.

Figure 8:
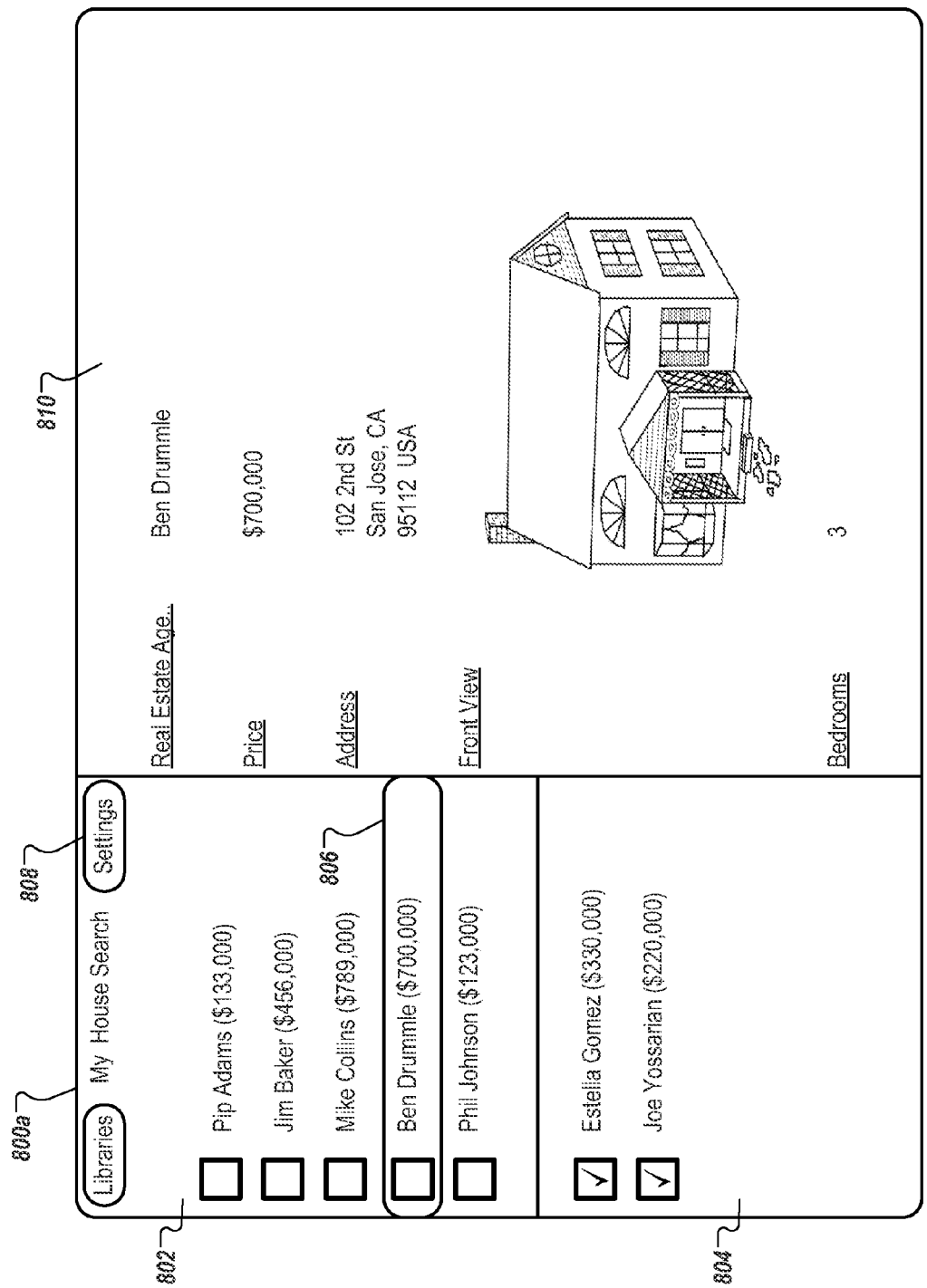
FIG. 8 illustrates an exemplary user interface for displaying data records of a database.

FIG. 8 illustrates exemplary user interface 800a for displaying data records of a database. User interface 800a can include selection sections 802 and 804 and data record viewing section 810.

Selection sections 802 and 804 can display a particular virtual view of a database. The virtual view can include data from selected data fields (e.g., "real estate agent" data field and "price" data field. The selected data fields can be configured in selection sections 802 and 804. Selection sections 802 and 804 can include one or more entries (e.g., entry 806), each entry corresponding to one or more data records in the database. A data record corresponding to a currently selected entry (e.g., entry 806) can be displayed in data record viewing section 810. If the data fields in selection sections 804 and 804 form a composite key of the database, each entry in selection sections 804 and 804 can correspond to a unique data record to be displayed in data record viewing section 810. Otherwise, it is possible that an entry in selection sections 804 and 804 can correspond to multiple data records. The multiple data records can be browsed in multiple pages of data record viewing section 810.

Through selection sections 802 and 804, the mobile device can receive a touch input to select particular entries. Selected entries can be displayed in selection section 804, and marked as selected (e.g., using check marks or highlights). Unselected entries can be displayed in selection section 802. In various implementations, the selected entries can be stored in the mobile device in a temporary database table, marked in the virtual view, or otherwise distinguished from unselected entries, to allow a user to browse only data record corresponding to the selected entries.

The entries in selection sections 802 and 804 can be sorted using various criteria, including, for example, in ascending or descending order based on one or more of the data fields (e.g., primarily ascending in alphabetic order according to names of real estate agents, and secondarily descending according to prices of properties). The entries in selection sections 802 and 804 can additionally or alternatively be sorted based on whether an entry is selected or unselected. Configuring various properties of selection sections 802 and 804 can be accomplished through settings control 808. Further details on settings control 808 will be described in further detail in reference to FIG. 9

Figure 9:
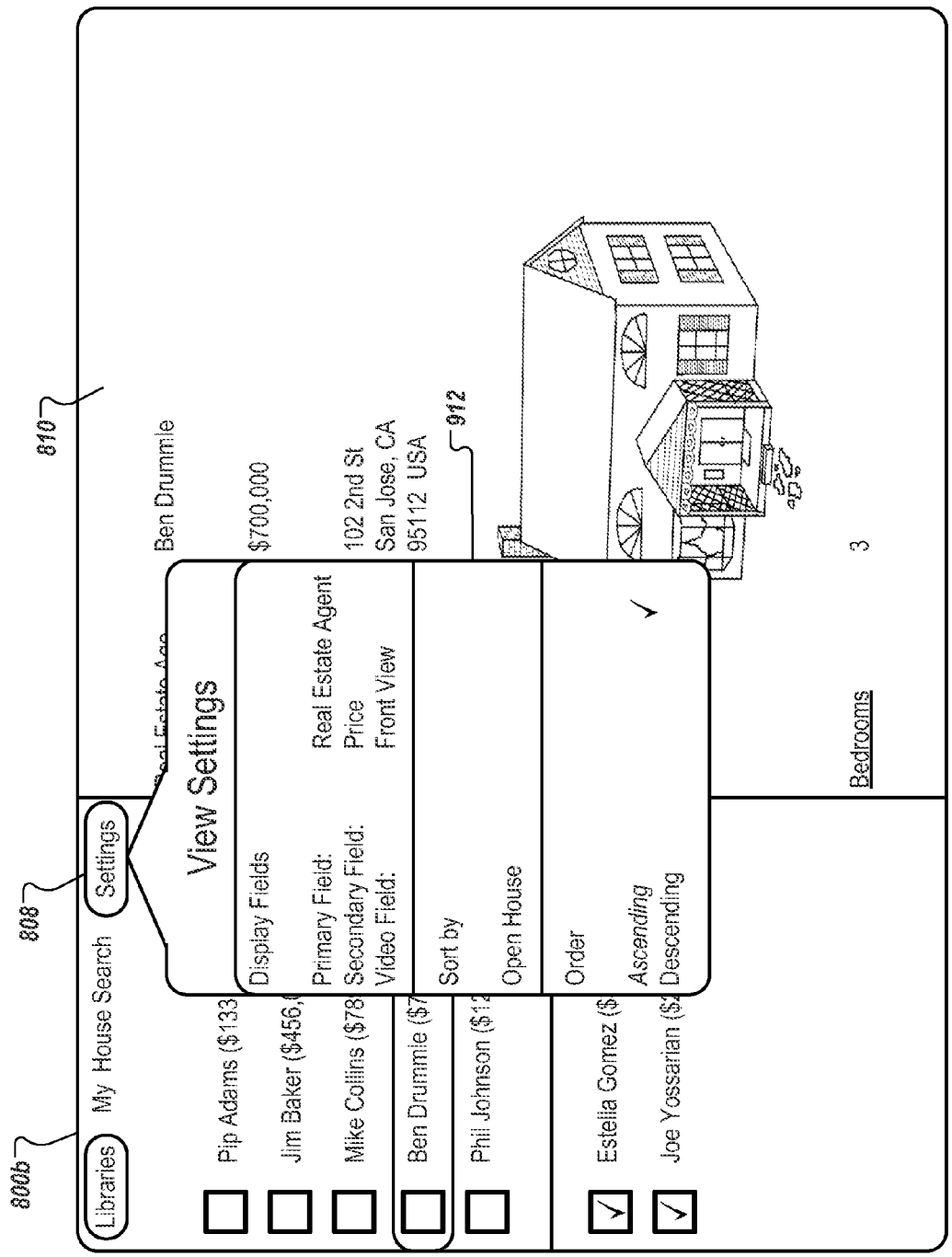
FIG. 9 illustrates an exemplary user interface for configuring a display of data records.

FIG. 9 illustrates exemplary user interface 800b for configuring a display of data records. User interface 800b can include selection sections 802 and 804 and data record viewing section 810.

Settings control 808 can be configured to receive a touch input. Upon receiving the touch input, view settings panel 912 can be displayed in user interface 800b. View settings panel 912 can include a "display fields" section. In the "display fields" section, a primary field and a secondary field can be specified. In addition, the "display fields" section can include additional data fields, one or more image fields, one or more video fields. Data from the primary field and secondary field can be displayed as entries in selection sections 802 and 804.

The primary field, secondary field, and additional data fields can be used as sorting fields. Additionally or alternatively, one or more sorting fields can be specified in a "sort by" section of view settings panel 912. For example, in the "sort by" section of view settings panel 912, an "open house" data field can be specified to allow the entries in selection sections 802 and 804 to be sorted by date of open house. The "sort by" section of view settings panel 912 can be configured to receive touch inputs to add more sorting fields, or to configure which field to sort upon. For example, upon receiving a touch input on sorting field "open house," the mobile device can display a field selection panel for selecting which data field is to be designated as a sorting field.

View settings panel 912 can include an "order" section that allows a user to specify which order to sort by (e.g., ascending or descending). The mobile device can configure a stored query using the primary field, secondary field, and sorting field, using the sort order specified in view settings panel 912. The configured query can be used to generate a virtual view for selection sections 802 and 804.

Figure 10:
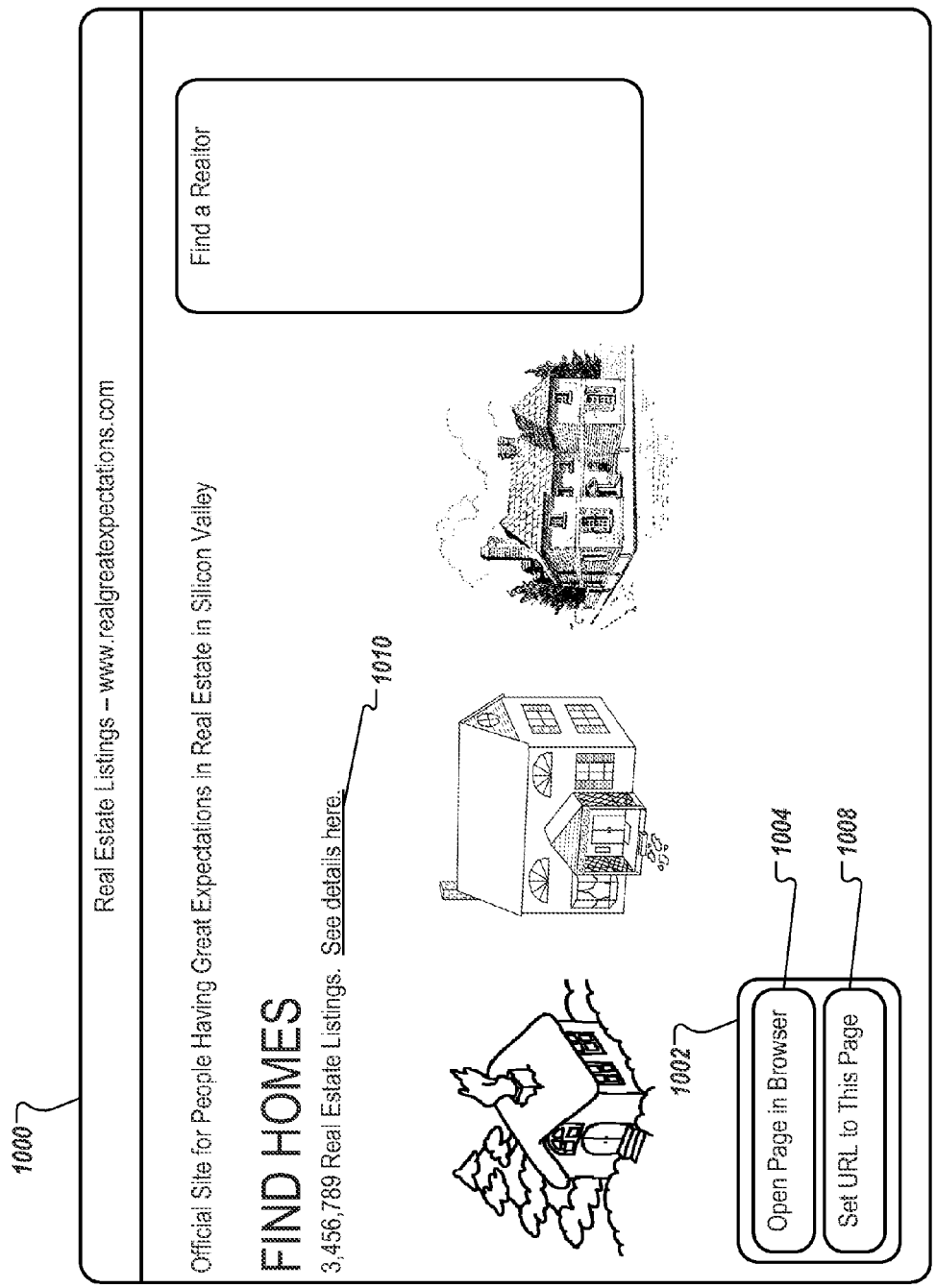
FIG. 10 illustrates an exemplary user interface for updating a data field while viewing a webpage.

FIG. 10 illustrates exemplary user interface 1000 for updating a data field while viewing a webpage. User interface 1000 can include a full-screen display of content of a webpage or of a file stored in a file system locally. User interface 1000 can be displayed, for example, when the mobile device receives a touch input through display field 130, which displays a uniform resource identifier (URI, e.g., a uniform resource locator (URL) "www.realgreatexpectations.com") that specifies where the content is located and how to retrieve the content (e.g., using hypertext transfer protocol (HTTP) by default).

User interface 1000 can include content manipulation panel 1002. Content manipulation panel 1002 can include button 1004. Button 1004 can be configured to receive a touch input for sending the content to a browser application. Upon receiving the touch input from button 1004, the mobile device can launch or notify the browser application (e.g., Safari™) and display the content currently displayed in user interface 1000 (e.g., a web page identified by URL "www.realgreatexpectations.com") to be displayed in the browser application.

Content manipulation panel 1002 can include button 1008. Button 1008 can be configured to receive a touch input to update a data field in the database. Display field 130 can correspond to a data field in the database that stores the URI. Upon receiving the touch input from button 1008, the mobile device can modify the data field to store a current URI. For example, through user interface 1000, the mobile device can receive a touch input on link 1010, which can include a second URI (e.g., URL "www.realtor.com"). Upon receiving the touch input on link 1010, user interface 1000 can display content from the URL "www.realtor.com." Upon receiving the touch input from button 1008, the mobile device can update the data field "listing URL" in the database, including changing the content of the data field "listing URL" from "www.realgreatexpectations.com" to "www.realtor.com."

In some implementations, user interfaces 100, 500, 800, and 1000 can be associated with display themes. The display themes can include various color schemes (e.g., various colors for borders of schema view 102, display view 120, and display fields) and various background images. For example, in a first theme, a background image can include an image of a leather pad and paper-like pages bound to the leather pad. Data view 120 can be displayed in the paper-like pages. In a second theme, a background image can include an image of a clip pad and paper-like pages being clipped to the clip pad. The mobile device can receive a touch input to switch between themes. Upon receiving the touch input, the first theme can be switched-out in a curl animation, revealing the second theme underneath. Each theme can be associated with theme-specific gestures, animations, and sounds. For example, a leather pad theme can be associated with gestures for turning pages from right to left. Browsing the data records under the leather pad theme can include flipping the pages from right to left. Sound associated with the leather pad theme can include sound of turning soft paper. A clip pad theme can be associated with gestures of pressing on the clip of the clip pad. Browsing the data records in the clip pad theme can include animation for taking a piece of paper away from the clip pad. Sound associated with the clip pad theme can include sound of the clip clicking.

Exemplary Relationships Between a GUI and a Database

Figure 11:
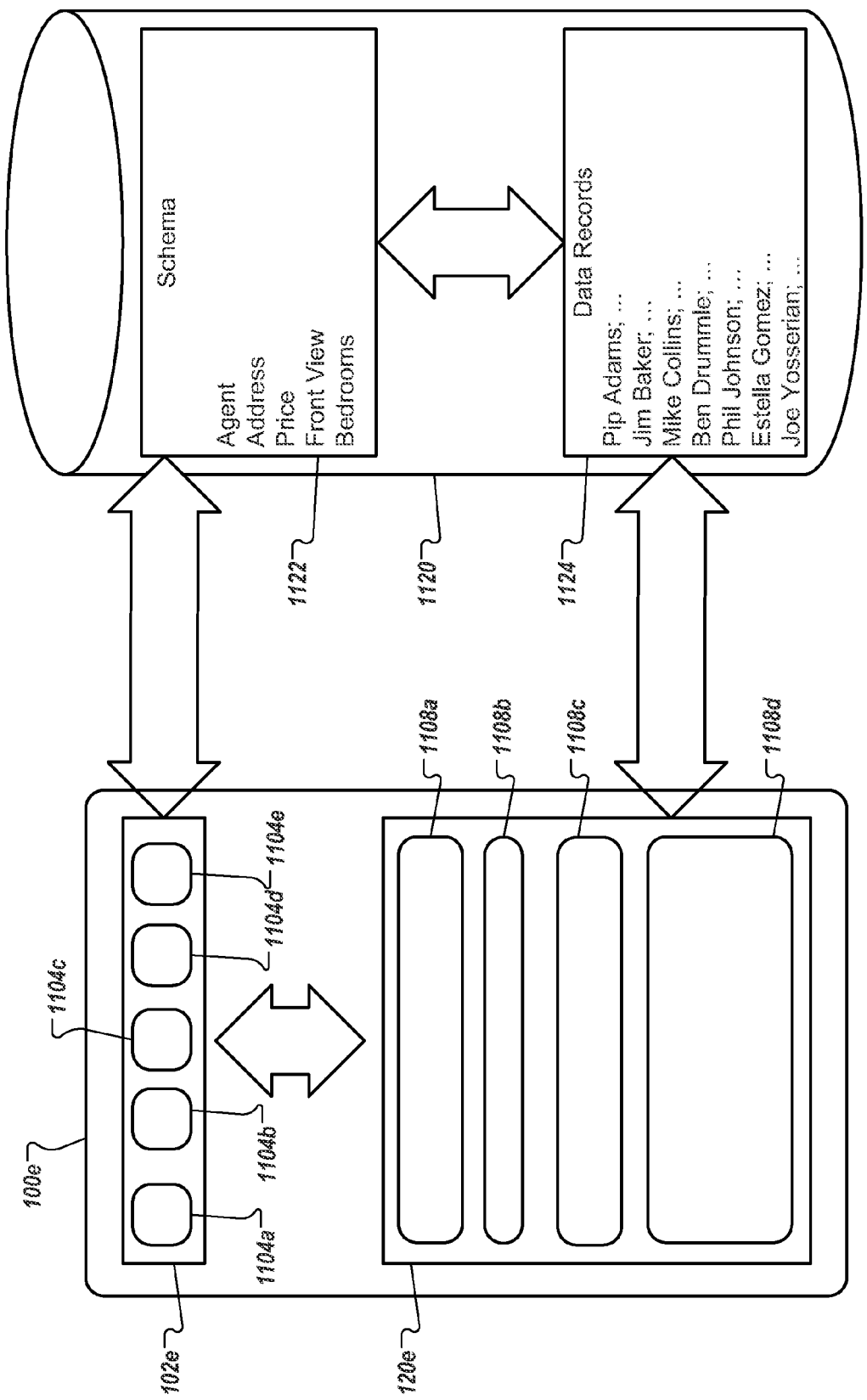
FIG. 11 is a block diagram illustrating exemplary relationships between a GUI and a database.

FIG. 11 is a block diagram illustrating exemplary relationships between GUI 100e and database 1120. GUI 100e can be displayed on a mobile device. Database 1120 can be a database hosted on the mobile device or hosted remotely on a server connected to the mobile device through a communications network.

Database 1120 can include schema 1122 and data records 1124. Data records 1124 can be data sets organized in accordance to schema 1122. For example, in a relational database, schema 1122 can include columns for tables. The columns can be names of data fields (e.g., "agent," "address," "front view," etc.). Schema 1122 can also include a type of each column. For example, a column "front view" can have a "media" type or a "video" type, which can be a subtype of the "media" type. Data records 1124 can be stored in the tables as rows of data records that have data fields corresponding to the columns, and data types in the data fields as specified by schema 1122. For example, a "front view" data field can include a video file or a source identifier of streaming video as specified in the "video" type. Schema 1122 can determine structure and format of data records 1124.

GUI 100e can include schema view 102e and data view 102e. Schema view 102e can correspond to schema 1122 of database 1120. Schema view 102e can include one or more representations 1104a-e of various data fields defined in schema 1122. Changes in schema 1122 can be reflected in schema view 102e. Changes in schema view 102e can cause changes in schema 1122, if the computing determines that a user making the changes has sufficient access privilege to update schema 1122.

Data view 120e can include one or more display fields 1108a-d of various data fields corresponding to one or more particular data records of data records 1124. Changes in data records 1124 can be reflected in data view 120e. Changes in data view 120e can cause changes in data records 1124, if the computing determines that a user making the changes has sufficient access privilege to update data records 1124.

Schema view 102e and data view 120e can form an integrated GUI (e.g., GUI 100e), such that changes in one view can cause substantially simultaneous changes in another view. For example, through GUI 102e, the mobile device can receive a touch input of a drag-and-drop motion, including adding a new column in schema 1122 and adding corresponding data fields to data records 1124. The touch input can include tapping or dragging-and-dropping a "new field" icon or label from schema view 102e to data view 120e, or tapping and deleting a data field in data view 120e. Thus, GUI 100e can provide the convenience of allowing schema changes from display areas preferred by various users.

In some implementations, schema 1122 and data records 1124 can be shared between mobile devices. A first mobile device can broadcast schema 1122 and data records 1124 to one or more second mobile devices that are located within a communication range of the first device, for example, using Bluetooth™ or WiFi technology. Applications of the broadcast can include, for example, a teacher wirelessly handing out assignments to students in a class, and the students wirelessly handing in completed assignments.

Exemplary Processes for Visual Manipulation of Database Schema

Figure 12:
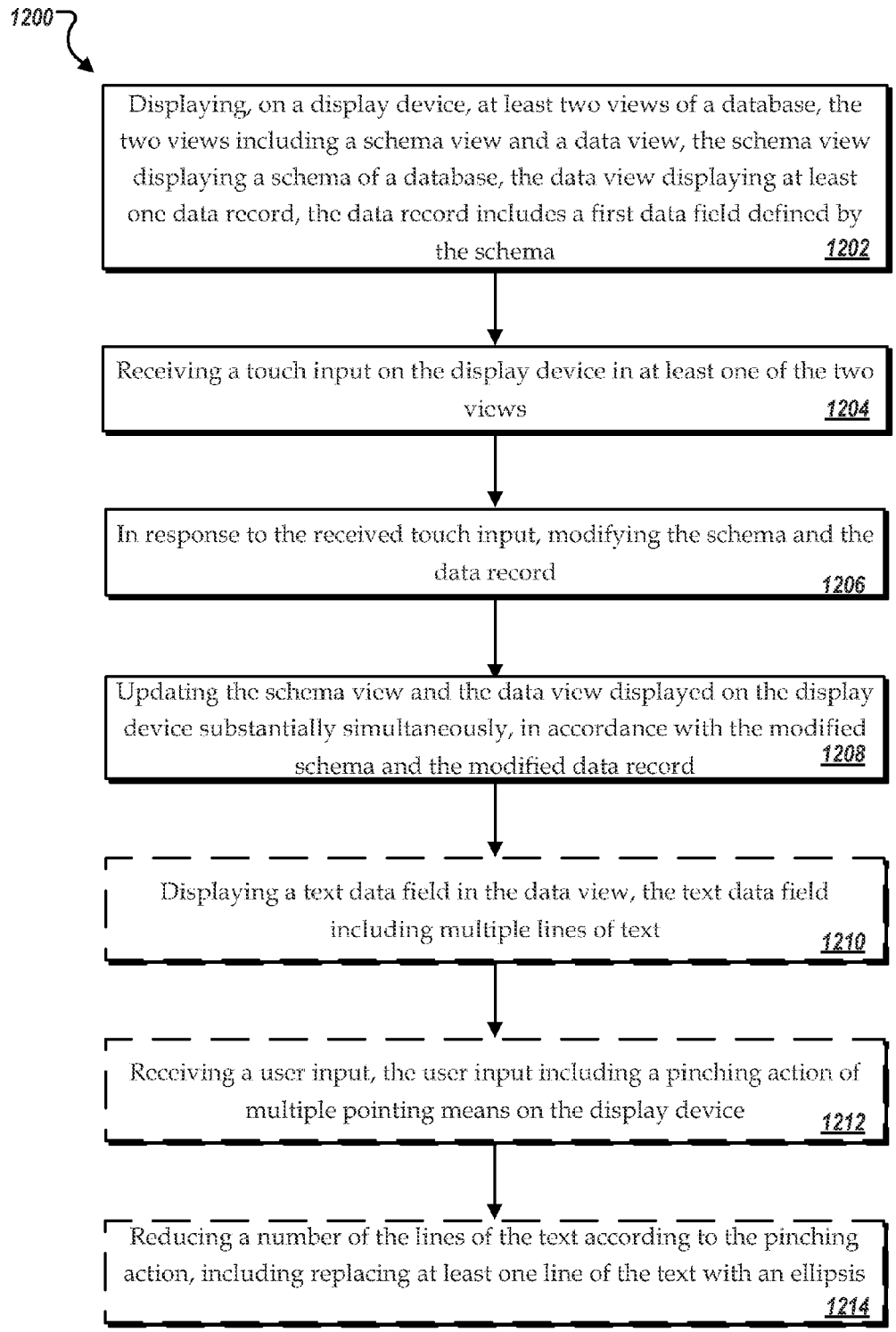
FIG. 12 is a flowchart illustrating an exemplary process of visually manipulating a database schema.

FIG. 12 is a flowchart illustrating exemplary process 1200 of visually manipulating a database schema.

A mobile device can display (1202), on a display device, at least two views of a database. The two views can include, for example, schema view 102 and data view 120. Schema view 102 can display a schema (e.g., schema 1122) of a database (e.g. database 1120), using various representations (e.g., representations 1104) to represent various data field definitions (e.g., columns) in schema 1122. Data view 120 can display at least one data record (e.g., a data record of data records 1124). The data record can include a first data field defined by schema 1122.

In some implementations, displaying the schema in schema view 102 can include displaying representations (e.g., icons or labels) of data fields that are hidden from data view 120. The data fields (e.g., a "year built" or an "open house date" data field) can be defined in schema 1122 and configured to be hidden from data view 120. Representations of hidden data fields can be displayed in schema view 102 distinctively from non-hidden data fields (e.g., as darkened or grayed-out icons or highlighted icons). In some implementations, schema view 102 can be configured to display only representations of hidden data fields or representations of non-hidden data fields.

The mobile device can receive (1204) a touch input from the display device in at least one of the two views. The display device can be a multi-touch sensitive display device, configured to receive touch inputs from one or more pointing means that are in contact with the display device. The touch input can include a touch, a tap, or a movement of a pointing means across the display and various gestures by actions of multiple pointing means (e.g., a pinching action, a spreading action, a swirling action, a grabbing action, a twitching action, etc.). The touch input can include a movement of the pointing means from one view to another. For example, the touch input can included dragging-and-dropping a display field from data view 120 to schema view 102, or dragging-and-dropping a representation from schema view 102 to data view 120.

Receiving the touch input can include detecting the drag-and-drop movement of the pointing means on the display device. The drag-and-drop movement can be used for displaying an originally hidden data field. Detecting the drag-and-drop movement can include receiving a touch of the display device on the representation (e.g., "year built" icon 110) by the pointing means, detecting a movement of the pointing means from schema view 102 into data view 120, and detecting that the pointing means is no longer in contact with the display device. Upon detecting the drag-and-drop movement of the pointing means, the mobile device can display the originally hidden data field in data view 120 (e.g., in display field 140).

In response to the received touch input, the mobile device can modify (1206) the schema (e.g., schema 1122) and the data record. Modifying the schema can include creating a new table, removing a table from the database, creating a new data field definition (e.g., a new column), removing a data field definition, modifying a data field definition, creating a new relationship between data fields, removing a relationship, modifying a relationship, and modifying access privileges to various tables and data columns, among others. Modifying the data record can include modifying data in various data fields of the data record and modifying display characteristics (e.g., whether to display or to hide) the data record or one or more fields of the data record.

The mobile device can update (1208) schema view 102 and data view 120 displayed on the display device substantially simultaneously, for example, giving an impression that schema view 102 and data view 120 are updated at the same time or in a single action. The update can be according to the modified schema and the modified data record.

In some implementations, receiving the touch input on the display device can include receiving a touch, by a pointing means, of a first handle (e.g., delete field control 442b) of a data field (e.g., data field "address") displayed in the data view (e.g., in display field 124). Modifying schema 1122 can include deleting the first data field (e.g., data field "address") from schema 1122. Updating schema view 102 and data view 120 can include deleting the data field, including display field 124, from data view 120, and deleting an icon representing data field "address" from schema view 102. Deleting the data field displayed in display field 124 can include visualizing the deleting in a crumpling animation. For example, display view 124 can be animated to shrink and fold up into a shape resembling a crumpled paper ball, the shape can be animated to move into a trashcan icon as if being thrown in the trashcan, or be animated to disappear by burning, evaporating, etc.

In some implementations, the mobile device can delete a data field (e.g., data field "front view") from schema 1122 upon receiving a grabbing motion in the display field (e.g., display field 128) from multiple pointing means. For example, the mobile device can detect a multi-touch of three, four, or five fingers on display field 128, and detect a pinching gesture. In response, the mobile device can delete the data field "front view" from schema 1122, and visualize the deletion using a crumpling animation of display field 128.

In some implementations, receiving the touch input on the display device can include receiving a touch, by a pointing means, of a second handle (e.g., hide field control 446c) of a data field (e.g., data field "price") displayed in data view (e.g., in display field 126). Upon receiving the touch of the second handle, the mobile device can update schema view 102 and data view 120. The updating can include deleting the data field "price," including display field 126 that displays the data field "price," from data view 120, and changing an icon corresponding to the data field "price" in schema view 102 in to a hidden state.

Optionally, the mobile device can display (1210) a text data field in the data view (e.g., in text display field 508). The text data field can include multiple lines of text. The mobile device can receive (1212) a user input. The user input can include a pinching gesture or a spreading gesture of multiple pointing means (e.g., from two or more fingers) on the display device. The mobile device can reduce (1214) a number of the lines of the text displayed according to the pinching action, including replace at least one line of the text with an ellipsis or other visual indicator. Likewise, the mobile device can increase the number of the lines of the text displayed according to the spreading gesture, including replacing the ellipsis with actual content of the text.

Exemplary Mobile Device Architecture

Figure 13:
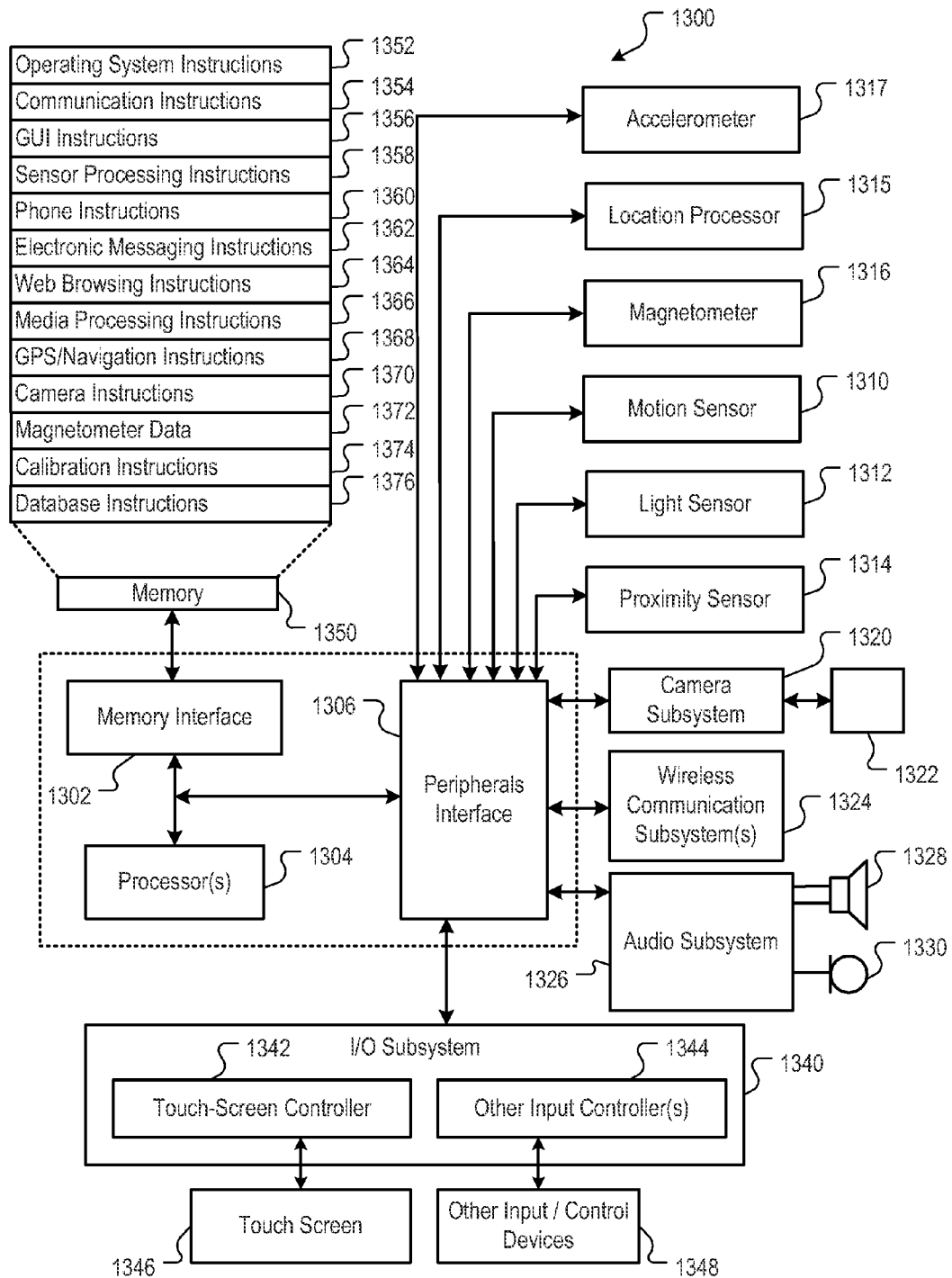
FIG. 13 is a block diagram illustrating an exemplary device architecture of a mobile device implementing the features and operations described in reference to FIGS. 1-12.

FIG. 13 is a block diagram illustrating exemplary device architecture 1300 of a mobile device implementing the features and operations described in reference to FIGS. 1-12. The mobile device can be, for example, a handheld computer, a personal digital assistant, a cellular telephone, an electronic tablet, a network appliance, a camera, a smart phone, an enhanced general packet radio service (EGPRS) mobile phone, a network base station, a media player, a navigation device, an email device, a game console, or a combination of any two or more of these data processing devices or other data processing devices.

The mobile device can include memory interface 1302, one or more data processors, image processors and/or processors 1304, and peripherals interface 1306. Memory interface 1302, one or more processors 1304 and/or peripherals interface 1306 can be separate components or can be integrated in one or more integrated circuits. Processors 1304 can include one or more application processors (APs) and one or more baseband processors (BPs). The application processors and baseband processors can be integrated in one single process chip. The various components in the mobile device, for example, can be coupled by one or more communication buses or signal lines.

Sensors, devices, and subsystems can be coupled to peripherals interface 1306 to facilitate multiple functionalities. For example, motion sensor 1310, light sensor 1312, and proximity sensor 1314 can be coupled to peripherals interface 1306 to facilitate orientation, lighting, and proximity functions of the mobile device. Location processor 1315 (e.g., GPS receiver) can be connected to peripherals interface 1306 to provide geopositioning. Electronic magnetometer 1316 (e.g., an integrated circuit chip) can also be connected to peripherals interface 1306 to provide data that can be used to determine the direction of magnetic North. Thus, electronic magnetometer 1316 can be used as an electronic compass. Accelerometer 1317 can also be connected to peripherals interface 1306 to provide data that can be used to determine change of speed and direction of movement of the mobile device.

Camera subsystem 1320 and an optical sensor 1322, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1324, which can include radio frequency receivers and transmitters and/or optical (e.g., infrared) receivers and transmitters. The specific design and implementation of the communication subsystem 1324 can depend on the communication network(s) over which a mobile device is intended to operate. For example, a mobile device can include communication subsystems 1324 designed to operate over a GSM network, a GPRS network, an EDGE network, a Wi-Fi or WiMax network, and a Bluetooth network. In particular, the wireless communication subsystems 1324 can include hosting protocols such that the mobile device can be configured as a base station for other wireless devices.

Audio subsystem 1326 can be coupled to a speaker 1328 and a microphone 1330 to facilitate voice-enabled functions, such as voice recognition, voice replication, digital recording, and telephony functions.

I/O subsystem 1340 can include touch screen controller 1342 and/or other input controller(s) 1344. Touch-screen controller 1342 can be coupled to a touch screen 1346 or pad. Touch screen 1346 and touch screen controller 1342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 1346.

Other input controller(s) 1344 can be coupled to other input/control devices 1348, such as one or more buttons, rocker switches, thumb-wheel, infrared port, USB port, and/or a pointer device such as a stylus. The one or more buttons (not shown) can include an up/down button for volume control of speaker 1328 and/or microphone 1330.

In one implementation, a pressing of the button for a first duration may disengage a lock of the touch screen 1346; and a pressing of the button for a second duration that is longer than the first duration may turn power to the mobile device on or off. The user may be able to customize a functionality of one or more of the buttons. The touch screen 1346 can, for example, also be used to implement virtual or soft buttons and/or a keyboard.

In some implementations, the mobile device can present recorded audio and/or video files, such as MP3, AAC, and MPEG files. In some implementations, the mobile device can include the functionality of an MP3 player. The mobile device may, therefore, include a pin connector that is compatible with the MP3 player. Other input/output and control devices can also be used.

Memory interface 1302 can be coupled to memory 1350. Memory 1350 can include high-speed random access memory and/or non-volatile memory, such as one or more magnetic disk storage devices, one or more optical storage devices, and/or flash memory (e.g., NAND, NOR). Memory 1350 can store operating system 1352, such as Darwin, RTXC, LINUX, UNIX, OS X, WINDOWS, or an embedded operating system such as VxWorks. Operating system 1352 may include instructions for handling basic system services and for performing hardware dependent tasks. In some implementations, operating system 1352 can include a kernel (e.g., UNIX kernel).

Memory 1350 may also store communication instructions 1354 to facilitate communicating with one or more additional devices, one or more computers and/or one or more servers. Memory 1350 may include graphical user interface instructions 1356 to facilitate graphic user interface processing; sensor processing instructions 1358 to facilitate sensor-related processing and functions; phone instructions 1360 to facilitate phone-related processes and functions; electronic messaging instructions 1362 to facilitate electronic-messaging related processes and functions; web browsing instructions 1364 to facilitate web browsing-related processes and functions; media processing instructions 1366 to facilitate media processing-related processes and functions; GPS/Navigation instructions 1368 to facilitate GPS and navigation-related processes and instructions; camera instructions 1370 to facilitate camera-related processes and functions; magnetometer data 1372 and calibration instructions 1374 to facilitate magnetometer calibration. The memory 1350 may also store other software instructions (not shown), such as security instructions, web video instructions to facilitate web video-related processes and functions, and/or web shopping instructions to facilitate web shopping-related processes and functions. In some implementations, the media processing instructions 1366 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 1350. Memory 1350 can include database instructions 1376 that can include functions for database 1120 and instructions for presenting database 1120 using user interfaces 100, 500, 800, and 1000.

Each of the above identified instructions and applications can correspond to a set of instructions for performing one or more functions described above. These instructions need not be implemented as separate software programs, procedures, or modules. Memory 1350 can include additional instructions or fewer instructions. Furthermore, various functions of the mobile device may be implemented in hardware and/or in software, including in one or more signal processing and/or application specific integrated circuits.

Exemplary Operating Environment

Figure 14:
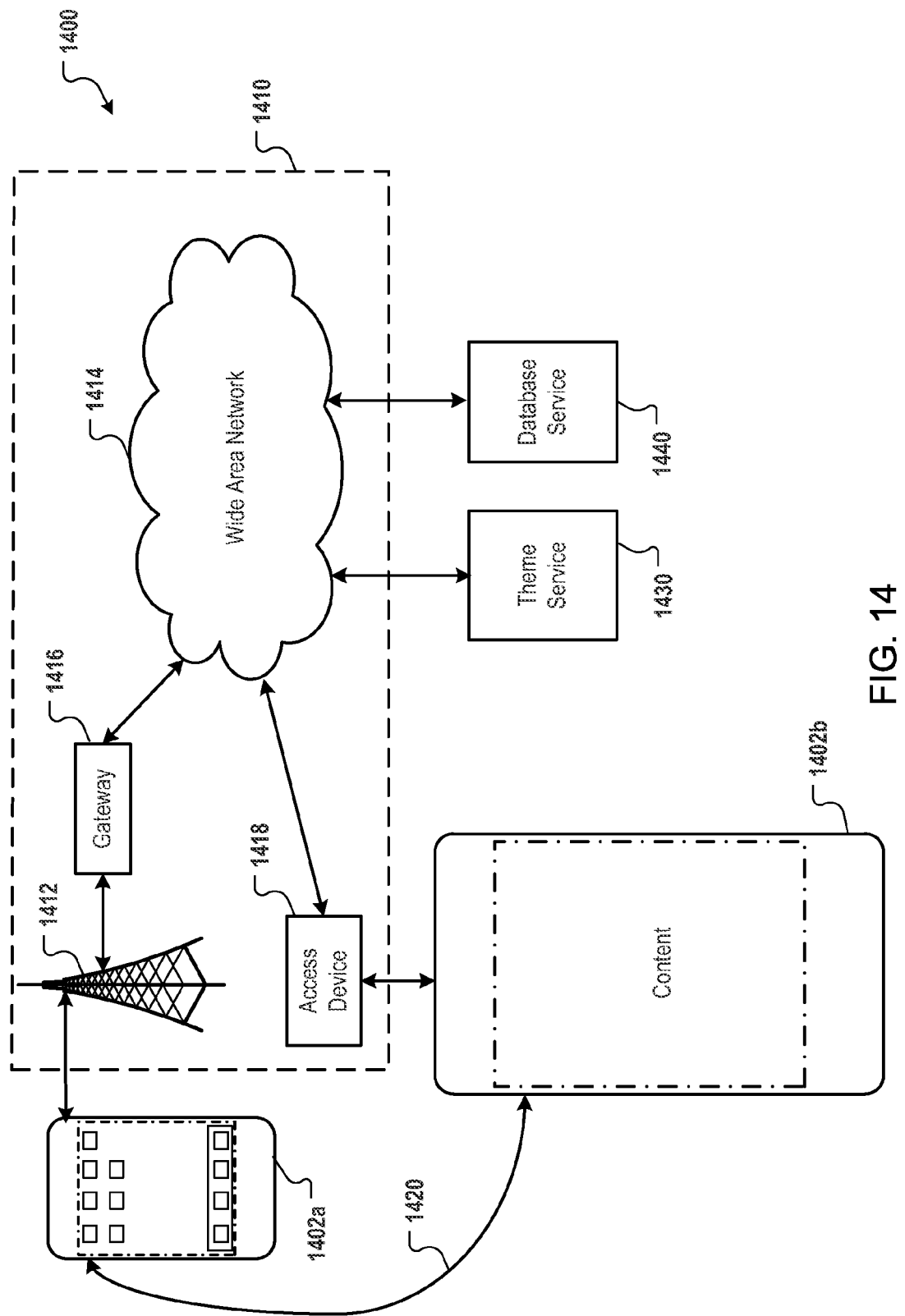
FIG. 14 is a block diagram of an exemplary network operating environment for the mobile devices of FIGS. 1-13.

FIG. 14 is a block diagram of exemplary network operating environment 1400 for the mobile devices of FIGS. 1-13. Mobile devices 1402a and 1402b can, for example, communicate over one or more wired and/or wireless networks 1410 in data communication. For example, a wireless network 1412, e.g., a cellular network, can communicate with a wide area network (WAN) 1414, such as the Internet, by use of a gateway 1416. Likewise, an access device 1418, such as an 802.11g wireless access device, can provide communication access to the wide area network 1414.

In some implementations, both voice and data communications can be established over wireless network 1412 and the access device 1418. For example, mobile device 1402a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 1412, gateway 1416, and wide area network 1414 (e.g., using Transmission Control Protocol/Internet Protocol (TCP/IP) or User Datagram Protocol (UDP)). Likewise, in some implementations, the mobile device 1402b can place and receive phone calls, send and receive e-mail messages, and retrieve electronic documents over the access device 1418 and the wide area network 1414. In some implementations, mobile device 1402a or 1402b can be physically connected to the access device 1418 using one or more cables and the access device 1418 can be a personal computer. In this configuration, mobile device 1402a or 1402b can be referred to as a "tethered" device.

Mobile devices 1402a and 1402b can also establish communications by other means. For example, wireless device 1402a can communicate with other wireless devices, e.g., other mobile devices 1402a or 1402b, cell phones, etc., over the wireless network 1412. Likewise, mobile devices 1402a and 1402b can establish peer-to-peer communications 1020, e.g., a personal area network, by use of one or more communication subsystems, such as the Bluetooth™ communication devices. Other communication protocols and topologies can also be implemented.

The mobile device 1402a or 1402b can, for example, communicate with one or more services 1430 and 1440 over the one or more wired and/or wireless networks. For example, one or more location theme services 1430 can include various downloadable themes for user interfaces 100, 500, 800, and 1000. The themes can each include a distinct gesture configuration. The themes can be provided for download to mobile devices 1402a and 1402b. One or more database services can include service for hosting database 1120, syncing database 1120 with other databases and allowing database 1120 to be shared between mobile devices 1402a and 1402b.

Mobile device 1402a or 1402b can also access other data and content over the one or more wired and/or wireless networks. For example, content publishers, such as news sites, Really Simple Syndication (RSS) feeds, web sites, blogs, social networking sites, developer networks, etc., can be accessed by mobile device 1402a or 1402b. Such access can be provided by invocation of a web browsing function or application (e.g., a browser) in response to a user touching, for example, a Web object.

A number of implementations of visual manipulation of database schema have been described. Nevertheless, it will be understood that various modifications can be made without departing from the spirit and scope of the invention. For example, a mobile device is described. A non-mobile device (e.g., a desktop computer or a server computer) can also be used to implement the features described.

The invention claimed is:

1. A method comprising:
providing for display on a touch-sensitive surface of a mobile device a schema view and a data view, the schema view displaying a schema of a database and comprising one or more data fields, the data view displaying at least one data record, the data record including a first data field defined by the schema;
receiving a touch input on the touch-sensitive surface, the touch input dragging a second data field from the schema view into the data view, the second data field being a component of the data record that was hidden from the data view before receiving the touch input;

in response to the received touch input, updating the schema view and the data view, including:

shifting a display location of the first data field to create space for the second data field in the data view; and providing content of the second data field of the data record for display in the space created by shifting the first data field.

2. The method of claim 1, wherein each data field in the schema view is represented as an icon.

3. The method of claim 2, wherein, following the touch input, the icon representing the second data field moves from the schema view into the data view.

4. The method of claim 3, wherein the display location of the first data field shifts in response to movement of the icon representing the second data field.

5. The method of claim 1, wherein updating the schema view and the data view comprises removing the second data field from the schema view or indicating, in the schema view, that the second data field is a visible data field.

6. The method of claim 1, comprising:

receiving, in the schema view, a new field input adding a new data field to the data record;

in response to the new field input, providing a new field user interface for display in the data view, the new field user interface usable to configure the new data field; and in response to an input moving the new field user interface, shifting at least one of the display location of the first data field or a display location of the second data field to create space for the new data field in the data view.

7. A system comprising:

one or more processors;

a non-transitory storage device storing instructions operable to cause the one or more processors to perform operations comprising:

providing for display on a touch-sensitive surface of a mobile device a schema view and a data view, the schema view displaying a schema of a database and comprising one or more data fields, the data view displaying at least one data record, the data record including a first data field defined by the schema;

receiving a touch input on the touch-sensitive surface, the touch input dragging a second data field from the schema view into the data view, the second data field being a component of the data record that was hidden from the data view before receiving the touch input;

in response to the received touch input, updating the schema view and the data view, including:

shifting a display location of the first data field to create space for the second data field in the data view; and providing content of the second data field of the data record for display in the space created by shifting the first data field.

8. The system of claim 7, wherein each data field in the schema view is represented as an icon.

9. The system of claim 8, wherein, following the touch input, the icon representing the second data field moves from the schema view into the data view.

10. The system of claim 9, wherein the display location of the first data field shifts in response to movement of the icon representing the second data field.

11. The system of claim 7, wherein updating the schema view and the data view comprises removing the second data field from the schema view or indicating, in the schema view, that the second data field is a visible data field.

12. The system of claim 7, the operations comprising:

receiving, in the schema view, a new field input adding a new data field to the data record;

in response to the new field input, providing a new field user interface for display in the data view, the new field user interface usable to configure the new data field; and in response to an input moving the new field user interface, shifting at least one of the display location of the first data field or a display location of the second data field to create space for the new data field in the data view.

13. A non-transitory storage device storing instructions operable to cause one or more processors to perform operations comprising:

providing for display on a touch-sensitive surface of a mobile device a schema view and a data view, the schema view displaying a schema of a database and comprising one or more data fields, the data view displaying at least one data record, the data record including a first data field defined by the schema;

receiving a touch input on the touch-sensitive surface, the touch input dragging a second data field from the schema view into the data view, the second data field being a component of the data record that was hidden from the data view before receiving the touch input;

in response to the received touch input, updating the schema view and the data view, including:

shifting a display location of the first data field to create space for the second data field in the data view; and providing content of the second data field of the data record for display in the space created by shifting the first data field.

14. The non-transitory storage device of claim 13, wherein each data field in the schema view is represented as an icon.

15. The non-transitory storage device of claim 14, wherein, following the touch input, the icon representing the second data field moves from the schema view into the data view.

16. The non-transitory storage device of claim 15, wherein the display location of the first data field shifts in response to movement of the icon representing the second data field.

17. The non-transitory storage device of claim 13, wherein updating the schema view and the data view comprises removing the second data field from the schema view or indicating, in the schema view, that the second data field is a visible data field.

18. The non-transitory storage device of claim 13, the operations comprising:

receiving, in the schema view, a new field input adding a new data field to the data record;

in response to the new field input, providing a new field user interface for display in the data view, the new field user interface usable to configure the new data field; and in response to an input moving the new field user interface, shifting at least one of the display location of the first data field or a display location of the second data field to create space for the new data field in the data view.

* * * * *